April 8, 1952 — P. C. SNYDER — 2,591,886
TOASTER
Filed July 5, 1949 — 3 Sheets-Sheet 1
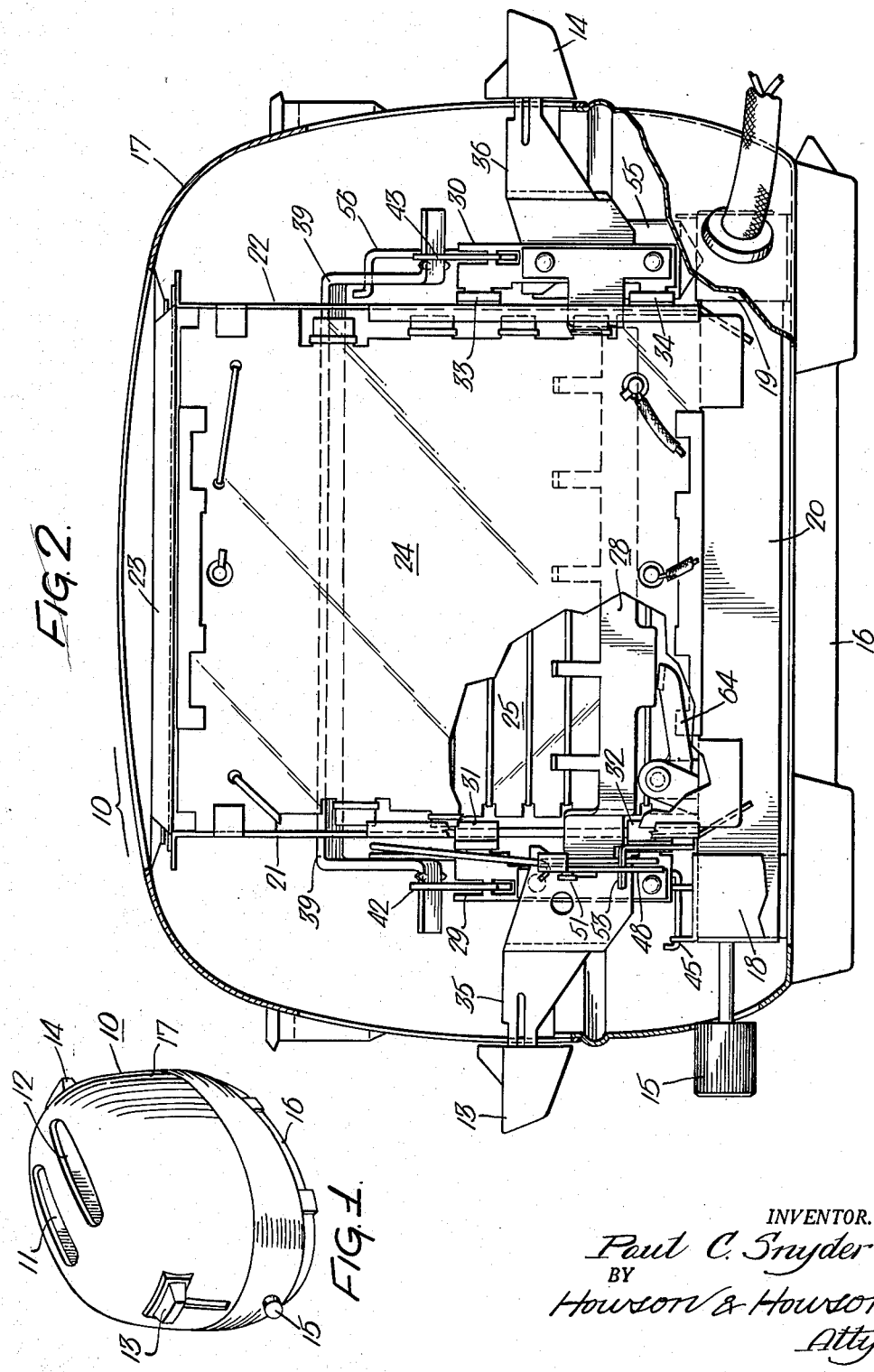
INVENTOR.
Paul C. Snyder
BY Howson & Howson
Attys.

April 8, 1952  P. C. SNYDER  2,591,886
TOASTER
Filed July 5, 1949  3 Sheets-Sheet 2
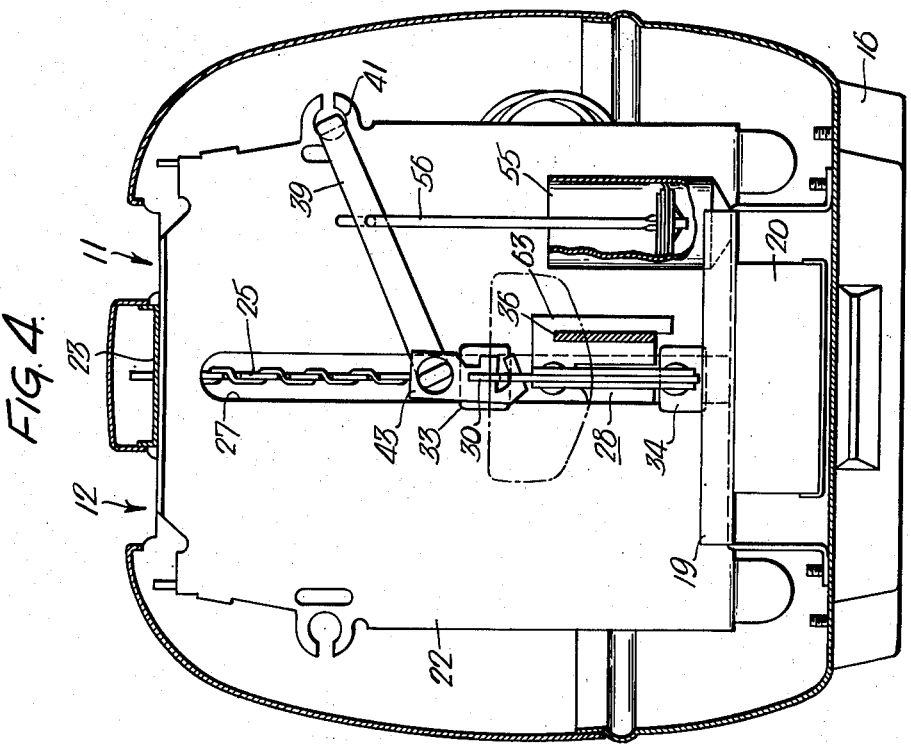
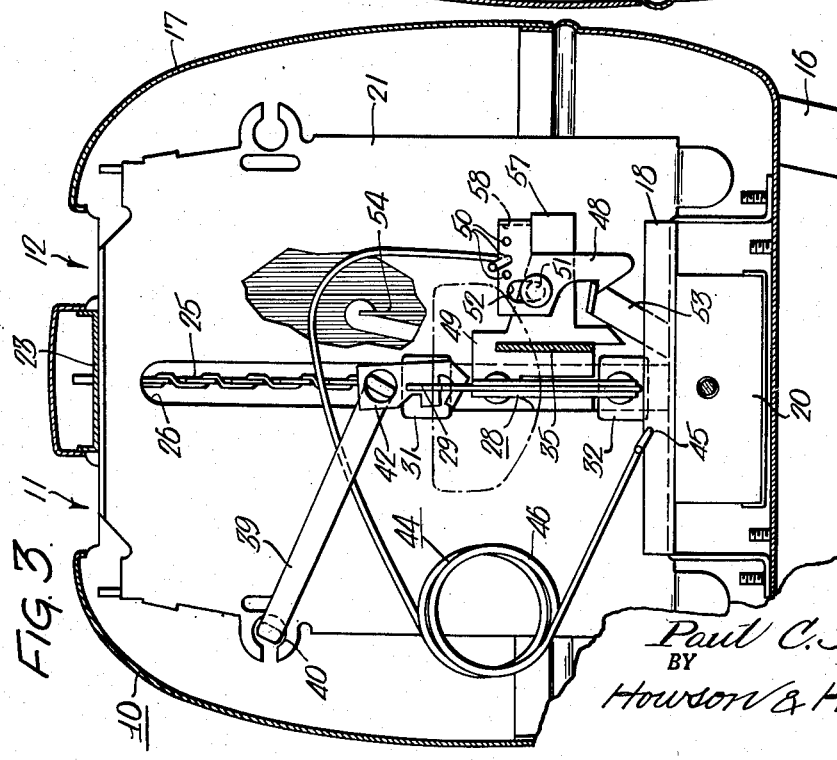
INVENTOR.
Paul C. Snyder
BY
Howson & Howson
Attys.

April 8, 1952 P. C. SNYDER 2,591,886
TOASTER
Filed July 5, 1949 3 Sheets-Sheet 3
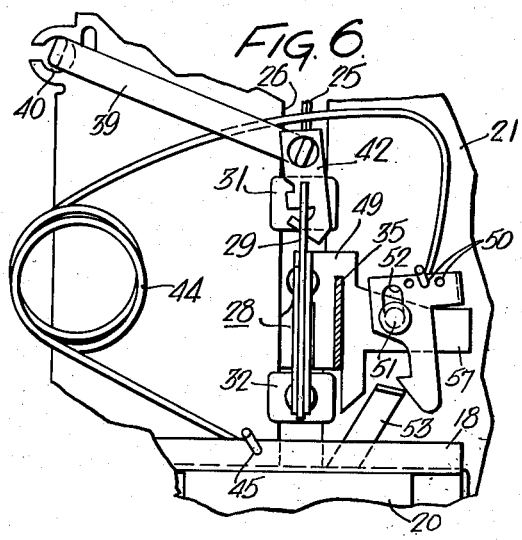
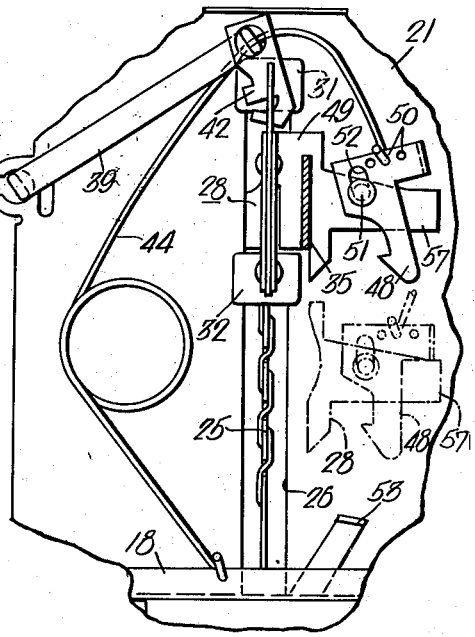
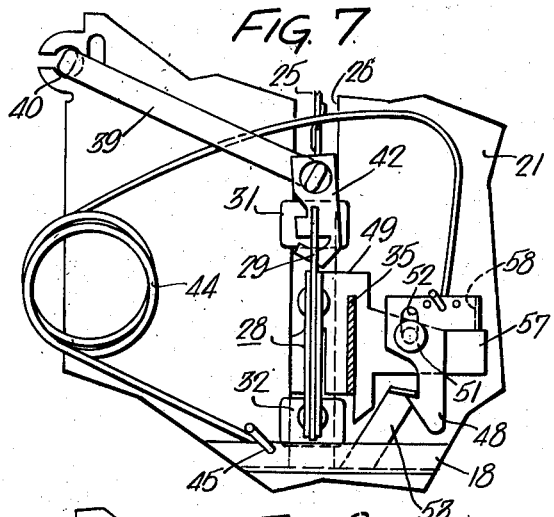
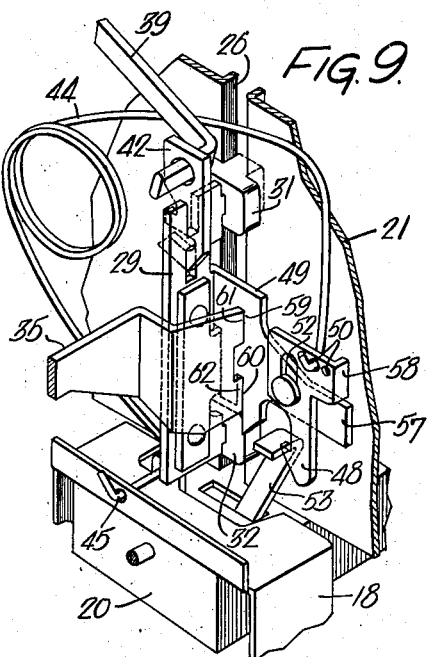
INVENTOR.
Paul C. Snyder
BY Howson & Howson Attys.

Patented Apr. 8, 1952

2,591,886

UNITED STATES PATENT OFFICE 2,591,886

TOASTER

Paul C. Snyder, Philadelphia, Pa., assignor to Proctor Electric Company, Philadelphia, Pa., a corporation of Pennsylvania Application July 5, 1949, Serial No. 103,078

15 Claims. (Cl. 99—391)

This invention relates to electric toasters and more particularly to an improved manual release mechanism for toasters of the type in which a bread carrier is latched in toasting position.

Heretofore manual release arrangements for electric toasters have been employed which include an auxiliary knob for releasing the toast carrier from the toasting position. Other arrangements have the manual operating knob, which is normally used to move the bread carrier from the non-toasting position to the toasting position, arranged so that release of the carrier is effected by moving the knob in a direction opposite to the original motion. In these arrangements the manual operating knob is pivoted with respect to the bread carrier so that reverse motion of said knob to release the carrier mechanically unlatches the members holding the carrier in the operative or toasting position.

One object of this invention is to provide a novel manual release mechanism which will be operable by merely moving the manual operating knob in a direction opposite to the toast setting motion, and in which there will be no relative motion between this manual operating knob and the bread carrier in the direction of carrier movement.

Another object is the provision of a manual release mechanism especially adaptable to a toast carrier which will permit the bread slice to be set into or released from the toasting position by manipulating a knob at either end of the toaster. This will permit the user an additional convenience for he may choose the nearer or the most conveniently situated manual operating knob without having to turn the toaster around. A study of the prior art devices reveals that they are inherently adaptable to single end operation only and do not provide a practical solution to this problem. The present invention not only provides for operation from either end, but further provides a system in which it is immaterial which knob is used to set the carrier into toasting position or which knob is used to release it from this position.

Other features and objects of the present invention will appear hereinafter.

In the drawings:

Fig. 1 is a small scale perspective view of a toaster embodying the invention;

Fig. 2 is a side elevational view of the toaster with the outer casing broken away for the purpose of illustration;

Fig. 3 is an end elevational view, with the casing broken away, taken at the end of the toaster where the latch mechanism is located;

Fig. 4 is a similar view taken at the opposite end of the toaster;

Figs. 5 to 8 are elevational views of the releasable latch mechanism showing the operation thereof; and Fig. 9 is a fragmentary perspective view of one end of the bread carrier assembly.

The invention is illustrated as applied to an automatic toaster of the type disclosed in a copending application of H. F. Hild, Serial No. 779,137, filed October 10, 1947, and assigned to the assignee of the present invention. It will be understood, however, that this invention is not limited to such a toaster.

The present invention is not concerned with many of the details of construction of the toaster, and therefore the accompanying drawings illustrate only so much of the toaster construction as is necessary for a complete disclosure of this invention.

Referring more particularly to the drawings, as shown in Fig. 1, the present invention is preferably applied to a two-well toaster designated generally by reference character 10 and having two bread-receiving openings 11 and 12. In this type of toaster the two bread slices are supported by a bread-carrier which is arranged to move vertically between a raised or non-toasting position and a lowered or toasting position. The bread-carrier is movable manually from the non-toasting position to the toasting position by means of the knobs 13 and 14 at the opposite ends of the toaster, which are connected to the bread-carrier to move the same, and either of which may be utilized to lower the carrier. The lowering of the bread-carrier is against the action of a spring which urges the carrier upward, and when the carrier is in its lowered or toasting position it is latched in that position by suitable latching means. The toaster illustrated is of the automatic variety in which the latching means is automatically released at the end of a toasting operation, according to the setting of the color adjusting knob 15.

In the use of such a toaster it is frequently desired to release the latch means manually to interrupt the toasting operation and as hereinbefore indicated the present invention is concerned with a latching arrangement adapted for manual release.

Referring particularly to Figs. 2 to 4, the toaster illustrated comprises a base 16 and an enclosing shell or housing 17 having the bread insertion openings 11 and 12 at the top thereof. Mounted within the base portion are a pair of end supports 18 and 19 which serve to support a base plate 20 on which are mounted a pair of vertical end plates 21 and 22. A top plate 23 extends between the end plates and is connected thereto. These various elements form a rigid framework which serves to support the toaster heating elements, one of the outer elements being shown in Fig. 2 at 24, and the central element being shown in Figs. 3 and 4 at 25.

The end plates 21 and 22 have vertical slots 26 and 27 therein (see Figs. 3 and 4) which serve as guides for the end portions of the bread-carrier assembly designated generally by reference character 28. At the opposite ends of the bread-carrier there are projecting plates 29 and 30 which serve as slidable supports for the carrier. To this end the plates 29 and 30 carry bushings 31, 32, 33, 34 which extend into and move in the slots 26 and 27 of the end plates 21 and 22. The carrier supporting plates 29 and 30 have attached thereto extending arms 35 and 36 which project through slots in the outer shell 17 and which carry the operating knobs 13 and 14.

An elongated U-shaped member 39 is pivotally supported by the end plates 21 and 22 at 40 and 41, and the arms of said member are interconnected with links 42 and 43 which in turn are connected to the carrier end plates 29 and 30. The purpose of the U-shaped member 39 is to transmit motion of either knob 13 or 14 from one end of the carrier to the other.

The bread-carrier is urged upward by a spring 44 located adjacent the end plate 21 as shown in Fig. 3. This spring has one of its ends connected to the end support 18 at 45, and the spring has several spiral turns at 46 and it is looped over the associated end of the carrier assembly and has its other end connected to a latch member 48 which is carried by a transversely extending portion 49 of the carrier end plate 29. It will be noted that the latch member 48 is provided with several apertures 50 any one of which may be utilized for connection of the end of spring 44. The latch member 48 is connected to the extending portion 49 of the carrier assembly through a lost motion connection which preferably comprises a pin 51 affixed on portion 49 and a slot 52 in the latch member 48. This connection enables relative movement between the carrier assembly and the latch member 48, the latter being mounted for rotational and translational movement relative to the carrier assembly. The purpose of this will be apparent later.

The latch member 48 cooperates with a latch member 53 which is held against movement by the bread-carrier, so that latching engagement of the two latch members retains the bread-carrier in the toasting position. In the particular toaster illustrated the latch member 53 is rotatable under control of a thermostat which is visible in Fig. 3 at 54. During automatic operation of the toaster the latch member 53 is moved to unlatching position at the end of the toasting operation, this releasing the bread-carrier. The present invention is not concerned with the mechanism by which automatic operation is effected, and therefore detailed illustration and description of such mechanism are unnecessary.

From the foregoing description it will be seen that when the latch members are disengaged, the spring 44 functions through latch member 48 to move the bread-carrier upward to the non-toasting position. As shown in Fig. 4 a dash-pot 55 is provided to retard the motion of the carrier. The movable element of the dash-pot is connected to one arm of the U-shaped member 39 through rod 56.

Referring now to the mechanism provided in accordance with the present invention for manual release of the bread-carrier, the operation of such mechanism is illustrated in Figs. 5 to 8. This mechanism includes the lost motion connection between the latch member 48 and the bread-carrier as hereinbefore described. It should be noted that the pin and slot 51, 52 are offset with respect to the point of connection of the spring 44 to the latch member 48. Furthermore, the carrier portion 49 has an extending arm 57, and the latch member 48 has a turned flange 58 which is engageable with said arm.

Considering the operation of the mechanism, when the carrier is in its raised or non-toasting position, the movable parts are disposed as shown in the solid line illustration of Fig. 5. As the carrier is moved downward toward the toasting position the spring 44 moves the latch member 48 clockwise about the pivot pin 51, causing the latch member to assume the position shown in the dot-and-dash illustration in Fig. 5. The spring tends to maintain the latch member 48 in this position, and when the nose of this latch member engages latch member 53, as shown in Fig. 6, the latch member 48 is slightly deflected about the pivot 51 and is moved into latching engagement with latch member 53, as shown in Fig. 7.

Assuming that it is desired to release the latch mechanism manually, prior to automatic release thereof, the operator merely exerts a slight upward force on one of the operating knobs 13 or 14. Due to the lost motion connection between the bread-carrier and the latch member 48, the carrier is enabled to move slightly upward relative to said latch member. Such slight movement of the carrier causes the latch member 48 to rotate slightly counter-clockwise, as viewed in Figs. 7 and 8, due to the engagement of arm 57 with the flange 58 on said latch member. Fig. 8 shows the latch member 48 during this slight rotary movement. Thus, the latch member 48 is rotated slightly counterclockwise about the point on the carrier assembly where the flange 58 engages the same. When the latch member 48 has been rotated sufficiently to disengage it from the latch member 53, the bread-carrier is released and is moved upward by the spring 44. At this time, the spring exerts an upward force on the latch member 48, causing the pin 51 to engage the lower end of slot 52. When the carrier reaches its raised or non-toasting position, the parts are again disposed as shown in Fig. 5.

From the foregoing description of the operation, it will be seen that the latch member 48 is caused to rotate about different points on the carrier assembly during the latching and release actions. As the bread-carrier is moved to the toasting position, the latch member 48 is caused to rotate about the pin 51 as a pivot to effect the latching action. When the bread-carrier is moved away away from the toasting position, the latch member 48 is caused to rotate about the point of engagement of the flange 58 with the arm 57. The rotation of the latch member 48 about two different pivot points on the carrier enables the latching and release functions to be performed in response to movement of the carrier to and from the toasting position.

The primary purpose of the slot 52 is to permit limited relative movement between the carrier and the latch member 48, and to restrain the latch member from spurious motion. The slot could be arranged to perform a slight camming action in conjunction with the pin 51, although this is not necessary.

It should be noted that the motion of the bread-carrier between the non-toasting and toasting positions causes a substantial motion of the latch member 48 relative to the pin 51. This is advantageous because it promotes free motion of said latch member and renders the latch system substantially immune to any binding or sticking action.

It will be apparent that the pin and slot connection between the bread-carrier and the latch member 48 could be reversed without affecting the operation of the latch mechanism. That is to say, the pin 51 could be provided on the latch member 48 and the slot 52 could be provided on the carrier.

It should be noted that the spring 44 performs several functions. It effects substantial movement of the latch member 48 as above mentioned, and it resets the latch member during movement of the carrier toward the toasting position. It also provides the lifting force for raising the carrier to the non-toasting position. While it would be possible to provide a plurality of springs to perform these functions, the use of a single spring is conducive to simplicity and economy. It should be noted further that the several holes in latch member 48 permit a fine adjustment of the force components exerted by the spring. This enhances control of the latch surface friction force and serves to compensate for production tolerances in the latching members.

As mentioned at the outset, the mechanism provided by the present invention does not require any relative movement between the carrier and its actuating knobs to effect movement of the carrier from the toasting position to the non-toasting position. Insofar as such movement is concerned, the knobs 13 and 14 are rigidly affixed to the carrier. Preferably, however, the knob carrying arms 35 and 36 are connected to the carrier in the manner illustrated in Fig. 9. This illustration shows the mounting of arm 35. The carrier extension 49 is provided with slots 59 and 60, and the arm 35 has fingers 61 and 62 which extend through said slots and have their ends bent to lock the parts together. The arm 36 is similarly secured to an extension 63 (see Fig. 4) at the opposite end of the carrier. This mounting of the arms 35 and 36 permits lateral movement of each arm but fixes each arm against vertical movement relative to the carrier. The slight permissible lateral movement of each arm is advantageous from the standpoint of assembly of the parts.

As previously mentioned, an important feature of the mechanism provided by the present invention is that the manual release of the latch members may be effected from either end of the toaster by means of either of the knobs 13 and 14. Although the knob 14 is located at the end of the toaster opposite the location of the latch mechanism, slight upward force applied to this knob will be transmitted through the carrier and through the U-shaped member 39 to the opposite end of the carrier.

In the illustrated embodiment, the U-shaped member 39 is instrumental in effecting release of the latch mechanism from the far end of the toaster as above described. While it is possible to provide a more rigid bread-carrier assembly that would eliminate the need for member 39 and would enable the releasing force to be transmitted entirely through the carrier, the illustrated embodiment is preferred because it enables liberal tolerances and facilitates manufacture and assembly.

No mention has been made of the control of the electric circuit for the toaster heating elements. While the present invention is not concerned therewith, it should be noted that in the toaster illustrated, a spring-biased lever 64 (Fig. 2) is engaged by the carrier and closes a switch in said circuit. Although the biasing spring for the lever 64 exerts some upward force on the bread carrier when the latter is in latched position, such force is insufficient to cause unlatching of the latch members.

While the invention has been described with reference to a particular embodiment, it is not limited thereto but is capable of other specific forms of physical expression.

I claim:

1. In a bread toaster, an enclosing housing adapted to receive a bread slice to be toasted, electric heating means arranged within said housing to toast a bread slice therein, a bread-carrier assembly within said housing movable between non-toasting and toasting positions, means within said housing adapted to move said carrier assembly to the non-toasting position, manual means having rigid connection with said carrier assembly as regards movement of the latter between said positions, said manual means extending exteriorly of said housing for access to the user, whereby said carrier assembly may be moved to the toasting position by force applied thereto through said manual means in a direction toward the toasting position, a first latch member within said housing fixed as regards movement of the carrier assembly, an extension on said carrier assembly within said housing, a second latch member within said housing connected to said extension through a lost-motion pivotal connection and engageable with said first latch member to retain said carrier assembly in the toasting position, said lost-motion connection permitting slight movement of the carrier assembly while the same is latched, and a projection on said second latch member engageable by said extension to effect unlatching movement of said second latch member upon slight movement of the carrier assembly by force applied thereto through said manual means, whereupon the carrier assembly moving means effects complete movement of the carrier assembly to the non-toasting position.

2. A bread toaster according to claim 1, including spring means connected to said second latch member and adapted to urge said carrier assembly toward the non-toasting position and to hold said second latch member in its latching position with said projection in engagement with said extension.

3. In a bread toaster, an enclosing housing adapted to receive a bread slice to be toasted, electric heating means arranged within said housing to toast a bread slice therein, a bread-carrier assembly within said housing movable between non-toasting and toasting positions, means within said housing adapted to move said carrier assembly to the non-toasting position, manual means having rigid connection with said carrier assembly as regards movement of the latter between said positions, said manual means extending exteriorly of said housing for access to the user, whereby said carrier assembly may be moved to the toasting position by force applied thereto through said manual means in a direction toward the toasting position, and latch and release mechanism wholly confined within said housing operable automatically to retain said carrier assembly in the toasting position and releasable by force applied to said carrier assembly through a small displacement of said manual means in a direction to move the carrier assembly away from the toasting position, whereupon the carrier assembly moving means effects complete movement of the carrier assembly to the non-toasting position, said latch and release mechanism comprising primary latching means stationary with respect to movement of the carrier assembly, and secondary latching means attached to said carrier assembly and arranged to rotate about a point relatively stationary with respect to the carrier assembly to permit engagement with said primary latching means, and to rotate about another point relatively stationary with respect to the carrier assembly to effect disengagement from said primary latching means.

4. A bread toaster according to claim 3, wherein said secondary latching means is connected to said carrier assembly through a lost-motion pivotal connection permitting slight movement of the carrier assembly while the same is latched, and wherein cooperative mutually engageable portions are provided on the carrier assembly and said secondary latching means to effect unlatching movement of the latter in response to said slight movement of the carrier assembly.

5. A bread toaster according to claim 4, including spring means connected to said secondary latching means and adapted to urge said carrier assembly toward the non-toasting position and to hold said secondary latching means in its latching position.

6. A bread toaster according to claim 5, wherein said secondary latching means has a plurality of apertures for selective connection of said spring means thereto, so as to vary the effect of said spring means upon the latching means.

7. A bread toaster according to claim 5, wherein said spring means has a spiral turn portion, and extending end portions one of which is anchored and the other is connected to said secondary latching means.

8. In a bread toaster, an enclosing housing adapted to receive a bread slice to be toasted, electric heating means arranged within said housing to toast a bread slice therein, a bread-carrier assembly within said housing movable between non-toasting and toasting positions, means within said housing adapted to move said carrier assembly to the non-toasting position, a pair of manual means having rigid connection with said carrier assembly as regards movement of the latter between said positions, the two manual means extending exteriorly of said housing at opposite ends of the toaster for access to the user, whereby said carrier assembly may be moved to the toasting position by force applied thereto through either of said manual means in a direction toward the toasting position, and latch and release mechanism wholly confined within said housing operable automatically to retain said carrier assembly in the toasting position and releasable by force applied to said carrier assembly through a small displacement of either of said manual means in a direction to move the carrier assembly away from the toasting position, whereupon the carrier assembly moving means effects complete movement of the carrier assembly to the non-toasting position, said latch and release mechanism comprising a first latch member which is stationary with respect to movement of the carrier assembly, and a second latch member connected to the carrier assembly through a lost-motion pivotal connection permitting slight movement of the carrier assembly while the same is latched, said carrier assembly and said second latch member having cooperative mutually engageable portions to effect unlatching movement of the second latch member in response to slight movement of the carrier assembly effected by force applied thereto through either of said manual means.

9. In a bread toaster, an enclosing housing adapted to receive a bread slice to be toasted, electric heating means arranged within said housing to toast a bread slice therein, a bread-carrier assembly within said housing movable between non-toasting and toasting positions, manual means having rigid connection with said carrier assembly as regards movement of the latter between said positions, said manual means extending exteriorly of said housing for access to the user, whereby said carrier assembly may be moved to the toasting position by force applied thereto through said manual means in a direction toward the toasting position, a first latch member within said housing fixed as regards movement of the carrier assembly, a second latch member within said housing cooperatively associated with the carrier assembly for latching engagement with said first latch member and movable out of latching engagement therewith by force applied to said carrier assembly through a small displacement of said manual means in a direction to move the carrier assembly away from the toasting position, and force-exerting means connected to said second latch member to exert force therethrough on the carrier assembly in a direction toward the non-toasting position but ineffective to move the carrier assembly from the toasting position until said second latch member is moved out of engagement with said first latch member.

10. In a bread toaster, an enclosing housing adapted to receive a bread slice to be toasted, electric heating means arranged within said housing to toast a bread slice therein, a bread-carrier assembly within said housing movable between non-toasting and toasting positions, manual means having rigid connection with said carrier assembly as regards movement of the latter between said positions, said manual means extending exteriorly of said housing for access to the user, whereby said carrier assembly may be moved to the toasting position by force applied thereto through said manual means in a direction toward the toasting position, a first latch member within said housing fixed as regards movement of the carrier assembly, a second latch member within said housing operatively connected to said carrier assembly and arranged to rotate about a point relatively stationary with respect to the carrier assembly to permit engagement with said first latch member, and to be forcibly moved through a surface relatively stationary with respect to the carrier assembly to effect disengagement from said first latch member, the latter movement of the second latch member being effected by force applied to said carrier assembly through a small displacement of said manual means in a direction to move the carrier assembly away from the toasting position, and force-exerting connected to said second latch member to exert force therethrough on the carrier assembly in a direction toward the non-toasting position but ineffective to move the carrier assembly from the toasting position until said second latch member is moved out of engagement with said first latch member.

11. In a bread toaster, an enclosing housing adapted to receive a bread slice to be toasted, electric heating means arranged within said housing to toast a bread slice therein, a bread-carrier assembly within said housing movable between non-toasting and toasting positions, a pair of manual means having rigid connection with said carrier assembly as regards movement of the latter between said positions, the two manual means extending exteriorly of said housing at opposite ends of the toaster for access to the user, whereby said carrier assembly may be moved to the toasting position by force applied thereto through either of said manual means in a direction toward the toasting position, a first latch member within said housing fixed as regards movement of the carrier assembly, a second latch member within said housing cooperatively associated with the carrier assembly for latching engagement with said first latch member and movable out of latching engagement therewith by force applied to said carrier assembly through a small displacement of either of said manual means in a direction to move the carrier assembly away from the toasting position, and force-exerting means connected to said second latch member to exert force therethrough on the carrier assembly in a direction toward the non-toasting position but ineffective to move the carrier assembly from the toasting position until said second latch member is moved out of engagement with said first latch member.

12. In a bread toaster, an enclosing housing adapted to receive a bread slice to be toasted, electric heating means arranged within said housing to toast a bread slice therein, a bread-carrier assembly within said housing movable between non-toasting and toasting positions, a pair of manual means having rigid connection with said carrier assembly as regards movement of the latter between said positions, the two manual means extending exteriorly of said housing at opposite ends of the toaster for access to the user, whereby said carrier assembly may be moved to the toasting position by force applied thereto through either of said manual means in a direction toward the toasting position, a first latch member within said housing fixed as regards movement of the carrier assembly, a second latch member within said housing operatively connected to said carrier assembly and arranged to rotate about a point relatively stationary with respect to the carrier assembly to permit engagement with said first latch member, and to be forcibly moved through a surface relatively stationary with respect to the carrier assembly to effect disengagement from said first latch member, the latter movement of the second latch member being effected by force applied to said carrier assembly through a small displacement of either of said manual means in a direction to move the carrier assembly away from the toasting position, and force-exerting means connected to said second latch member to exert force therethrough on the carrier assembly in a direction toward the non-toasting position but ineffective to move the carrier assembly from the toasting position until said second latch member is moved out of engagement with said first latch member.

13. In a bread toaster, an enclosing housing adapted to receive a bread slice to be toasted, electric heating means arranged within said housing to toast a bread slice therein, a bread-carrier within said housing movable between an upper non-toasting position and a lower toasting position, force-exerting means within said housing for moving said carrier to the non-toasting position, a latching mechanism within said housing at one end of the toaster for latching the carrier in the toasting position, and releasable by an upward displacing force acting on the carrier at its latch end through a small distance, a first manual element connected to the carrier at the latch end thereof and extending from said housing, through which manual force may be applied to the latch end of the carrier to release said latching mechanism, a second manual element connected to the carrier at the other end thereof and extending from said housing, and a rigid equalizing member connected between the ends of the carrier to transmit force from said second element to the latch end of the carrier, whereby the release of said latching mechanism may be effected from the other end of the toaster with substantially the same facility as from the latch end.

14. A bread toaster according to claim 13, wherein said latching mechanism includes a first latch member fixed as regards movement of the carrier, and a second latch member cooperatively associated with the carrier for latching engagement with said first latch member and movable out of latching engagement therewith by force applied to said carrier through a small upward displacement of either of said manual elements, said force-exerting means being connected to said second latch member to exert force therethrough on the carrier.

15. A bread toaster according to claim 13, including slotted end plates through which end portions of said carrier extend, said equalizing member being pivotally supported by said end plates and connected to the end portions of the carrier through connecting links.

PAUL C. SNYDER.

REFERENCES CITED

The following references are of record in the file of this patent:

UNITED STATES PATENTS

| Number | Name | Date |
|---|---|---|
| 2,106,824 | Bayne | Feb. 1, 1938 |
| 2,141,867 | Ireland | Dec. 27, 1938 |
| 2,284,450 | Sardeson | May 26, 1942 |
| 2,285,231 | Scharf | June 2, 1942 |
| 2,336,696 | McCullough | Dec. 14, 1943 |
| 2,344,842 | Weeks | Mar. 21, 1944 |
| 2,367,044 | Newell | Jan. 9, 1945 |
| 2,370,404 | Huck | Feb. 27, 1945 |
| 2,416,014 | McCullough | Feb. 18, 1947 |